US008852005B2

(12) United States Patent
Kim

(10) Patent No.: US 8,852,005 B2
(45) Date of Patent: Oct. 7, 2014

(54) ANGLED OFFSET BALL TYPE CONSTANT VELOCITY JOINT FOR VEHICLE

(75) Inventor: Pil Ki Kim, Dongjak-gu (KR)

(73) Assignee: Hyundai Wia Corporation, Gyeongsangnam-Do (KR)

(*) Notice: Subject to any disclaimer, the term of this patent is extended or adjusted under 35 U.S.C. 154(b) by 0 days.

(21) Appl. No.: 13/292,352

(22) Filed: Nov. 9, 2011

(65) Prior Publication Data
US 2013/0116056 A1 May 9, 2013

(51) Int. Cl.
F16D 3/2245 (2011.01)

(52) U.S. Cl.
CPC ............ *F16D 3/2245* (2013.01); *Y10S 464/906* (2013.01)
USPC ........................................... 464/145; 464/906

(58) Field of Classification Search
USPC .................... 464/140, 145, 146, 906
See application file for complete search history.

(56) References Cited

U.S. PATENT DOCUMENTS

| 155,149 | A |  | 9/1874 | Fobsyth |  |
|---|---|---|---|---|---|
| 802,341 | A |  | 10/1905 | Murray |  |
| 2,046,584 | A | * | 7/1936 | Rzeppa | 464/145 |
| 2,299,136 | A |  | 10/1942 | Feldman |  |
| 4,589,857 | A |  | 5/1986 | Okoshi |  |
| 4,968,287 | A | * | 11/1990 | Jacob | 464/145 |
| 5,122,096 | A |  | 6/1992 | Aucktor et al. |  |
| 6,120,382 | A |  | 9/2000 | Sone et al. |  |
| 6,267,682 | B1 |  | 7/2001 | Sone et al. |  |
| 6,383,082 | B1 | * | 5/2002 | Declas | 464/145 |
| 7,128,654 | B2 | * | 10/2006 | Ohwaki et al. | 464/145 |
| 8,096,887 | B2 | * | 1/2012 | Oh et al. | 464/145 |
| 8,162,765 | B2 | * | 4/2012 | Sone et al. | 464/145 |
| 2009/0054166 | A1 |  | 2/2009 | Hoshino et al. |  |
| 2010/0016086 | A1 | * | 1/2010 | Sone et al. | 464/145 |
| 2011/0065519 | A1 |  | 3/2011 | Sone et al. |  |

FOREIGN PATENT DOCUMENTS

| EP | 0802341 |  | 10/1997 |  |
|---|---|---|---|---|
| EP | 2299136 | A1 | 3/2011 |  |
| FR | 2854214 | A1 | 10/2004 |  |
| GB | 1150778 | A * | 4/1969 | 464/145 |
| GB | 2155149 |  | 9/1985 |  |
| JP | 60220225 | A | 11/1985 |  |
| JP | 8128454 |  | 5/1996 |  |
| JP | 20020541395 |  | 12/2002 |  |
| JP | 2007263163 |  | 10/2007 |  |
| JP | 2007320351 |  | 12/2007 |  |

* cited by examiner

*Primary Examiner* — Gregory Binda
*Assistant Examiner* — Matthieu Setliff
(74) *Attorney, Agent, or Firm* — Stetina Brunda Garred & Brucker

(57) ABSTRACT

An angled offset ball type constant velocity joint for a vehicle, which can enhance the strength of the joint by compensating for a contact surface pressure between an outer race groove and a ball while maintaining an outer diameter of the outer race by making rotation centers of the outer race and the inner race positioned to be symmetrical with respect to each other by an offset angle. The angled offset ball type constant velocity joint includes an inner race connected to an end of a shaft, an outer race installed outside the inner race, a plurality of balls for transmitting a torque of the inner race to the outer race, and a cage having windows for supporting the respective balls, wherein a rotation center of an outer race ball track is symmetrical with a rotation center of an inner race ball track by an offset angle.

16 Claims, 7 Drawing Sheets

ANGLED OFFSET BALL TYPE CONSTANT VELOCITY JOINT FOR VEHICLE

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to an angled offset ball type constant velocity joint for a vehicle, and more particularly, to an angled offset ball type constant velocity joint for a vehicle, which can enhance the strength of the joint by compensating for a contact surface pressure between an outer race groove and a ball while maintaining an outer diameter of an outer race by making an outer race rotation center and an inner race rotation center positioned to be symmetrical with respect to each other by an offset angle.

2. Description of the Related Art

In general, a joint functions to transmit rotational power (torque) between two rotation shafts which meet each other at an angle. In the case of a propeller shaft having a small power transmission angle, a hook joint, a flexible joint, etc. are used, and in the case of the driving shaft of a front wheel drive vehicle having a large power transmission angle, a constant velocity joint is used.

Since the constant velocity joint can reliably transmit power at a constant velocity even when an angle between a driving shaft and a driven shaft is large, the constant velocity joint is mainly used for the axle shaft of an independent suspension type front wheel drive vehicle. When viewed from a shaft, a tripod type constant velocity joint is provided to one end of the shaft which faces an engine (i.e., the inboard-side end), and a ball type joint is provided to the other end of the shaft which faces a tire (i.e., the outboard-side end).

FIG. 1 is a cross-sectional view illustrating conventional constant velocity joints, and FIG. 2 is a schematic view illustrating an external appearance of the conventional constant velocity joints shown in FIG. 1.

As shown in FIGS. 1 and 2, the conventional constant velocity joints comprise a tripod type constant velocity joint which is provided to the right end of a shaft 1 which faces an engine (the inboard-side end) and a ball type constant velocity joint provided to the left end of the shaft 1 which faces a tire (the outboard-side end).

The tripod type constant velocity joint installed on the right end of the shaft 1 (which faces the engine) comprises a housing 2 which transmits rotational power of the engine (not shown) and is defined with track grooves on the inner surface thereof, the shaft 1 which receives the rotational power from the housing 2 and rotates, a spider 3 which is disposed in the housing 2, is coupled to one end of the shaft 1 to connect the housing 2 and the shaft 1 with each other and is formed with three trunnions to be respectively inserted into the track grooves of the housing 2, needle rollers 6 which are arranged on the circumferential outer surface of each trunnion of the spider 3, inner rollers 5 each of which is arranged around the needle rollers 6 for each trunnion of the spider 3, outer rollers 4 each of which is installed on the circumferential outer surface of each inner roller 5 to reduce friction between the housing 2 and the shaft 1, a retainer ring 8 which is installed on the upper ends of the needle rollers 6 and of each inner roller 5, a boot 10 having one end which is connected to the housing 2 and the other end which is connected to the shaft 1, and clamping bands 11 and 12 which clamp both ends of the boot 10.

The ball type constant velocity joint installed on the left end of the shaft 1 (which faces the tire) comprises an inner race 15 which is installed on the left end of the shaft 1 to receive the rotational power from the tripod type constant velocity joint and to then rotate, an outer race 13 which is installed around the inner race 15, balls 16 for transmitting the rotational power of the inner race 15 to the outer race 13, a cage 14 for supporting the balls 16, a sensor ring 17 which is installed around the outer race 13, a boot 18 having one end which is connected to the shaft 1 and the other end which is connected to the outer race 13, and clamping bands 19 and 20 which clamp both ends of the boot 18.

A damper 21 is installed at the center of the shaft 1 using bands 22 and 23 and has a weight 211 installed in a body 212.

Hereafter, the operation of the conventional constant velocity joints constructed as mentioned above will be described.

As the rotational power outputted from an engine (not shown) is transmitted to the housing 2 through a transmission (not shown), the housing 2 is rotated. The rotational power of the housing 2 is transmitted to the spider 3 through the outer rollers 4, the inner rollers 5 and the needle rollers 6, and then the shaft 1 to which the spider 3 is coupled is rotated. The rotational power of the shaft 1 is transmitted to the outer race 13 through the inner race 15 and the balls 16, and then the wheel (not shown) connected to the outer race 13 is rotated.

In the tripod type constant velocity joint which is provided to the right end of the shaft 1 which faces the engine (i.e., the inboard-side end), as the outer rollers 4 slide in the track grooves of the housing 2, the rotation angle of the shaft 1 which is operationally associated with the outer rollers 4 is changed, so that a joint angle is created to follow the displacement of a vehicle. In the ball type constant velocity joint which is provided to the left end of the shaft 1 which faces the tire (i.e., the outboard-side end), the rotation angle of the outer race 13 is changed due to the presence of the balls 16, so that a joint angle is created to follow the displacement of the vehicle.

The boot 10 of the tripod type constant velocity joint and the boot 18 of the ball type constant velocity joint respectively function to enclose the tripod type constant velocity joint and the ball type constant velocity joint, so that the tripod type constant velocity joint and the ball type constant velocity joint are prevented from being contaminated by foreign substances.

In addition, when the torque outputted from the engine and the transmission through the shaft 1 to wheels, unbalanced rotation may occur at a certain rotation angle of the shaft 1 rotating at high speed, which may result in undesired vibrations and adversely affect the operation of a drive system. In order to prevent the undesired vibrations due to unbalanced rotation, the damper 2 installed at the center of the shaft 1 may prevent booming noises from occurring to the shaft 1 rotating at high speed due to the detrimental vibration frequency.

FIG. 3 is an exploded view illustrating a conventional ball type constant velocity joint for a vehicle, FIG. 4 is a perspective view of the conventional ball type constant velocity joint shown in FIG. 1, FIG. 5 is a cross-sectional view illustrating the conventional ball type constant velocity joint for a vehicle before a joint angle is created, and FIG. 6 is a cross-sectional view illustrating the conventional ball type constant velocity joint shown in FIG. 5 after a joint angle is created.

As shown in FIGS. 3 to 6, in the conventional ball type constant velocity joint for a vehicle, the ball 16 is fixed by the cage 14 and the inner race 15. During steering, the ball 16 is moved in the groove formed on a circumferential inner surface of the outer race 13 in a lengthwise direction.

A ball track (OBT) of the outer race 13 is formed to trace a radius R2 ranging from a rotation center r2 and a ball track (IBT) of the inner race 15 is formed to trace a radius R3 from a rotation center r3.

A funnel angle (f) formed between the rotation center r2 of the outer race ball track (OBT) and the rotation center r3 of the inner race ball track (IBT) at the center of the balls 36 is in a range of 12° to 15° for a 6-ball type joint and is in a range of 7° to 12° for a 8-ball type joint. The funnel angle (f) facilitates bending and rotating of the joint. Here, if the funnel angle (f) is not secured, the joint may get jammed and the efficiency of the joint may be lowered.

The rotation center r2 of the outer race ball track (OBT) and the rotation center r3 of the inner race ball track (IBT) are positioned to be parallel with each other by a constant offset amount R1 with regard to a joint rotation center r1. At the time of bending, the cage 14 and the balls 16 rotate by half a joint angle amount of the inner race 15, and the rotation center r2 of the outer race ball track (OBT) and the rotation center r3 of the inner race ball track (IBT) are rotated along a radius corresponding to the offset amount R1 with respect to the joint rotation center r1.

However, according to the trend toward lightweight and compact ball type constant velocity joints, the cage of the conventional ball type constant velocity joint may be subjected to intensified stress.

BRIEF SUMMARY OF THE INVENTION

Accordingly, the present invention has been made to solve the above-mentioned problems occurring in the prior art, and an object of the present invention is to provide an angled offset ball type constant velocity joint for a vehicle, which can enhance the strength of the joint by compensating for a contact surface pressure between an outer race groove and a ball while maintaining an outer diameter of the outer race by making an outer race rotation center and an inner race rotation center positioned to be symmetrical with respect to each other by an offset angle.

In accordance with one aspect of the present invention, there is provided an angled offset ball type constant velocity joint for a vehicle, including an inner race connected to an end of a shaft, an outer race installed outside the inner race, a plurality of balls for transmitting a torque of the inner race to the outer race, and a cage having windows for supporting the respective balls, wherein a rotation center of an outer race ball track is symmetrical with a rotation center of an inner race ball track by an offset angle.

Preferably, a contact area of a portion in a groove of the outer race is increased by the offset angle, the portion implementing the smallest contact area with respect to the ball when a joint angle is maximized.

Preferably, a contact area of a portion in a groove of the inn race is reduced by the offset angle, the portion implementing the largest contact area with respect to the ball when a joint angle is maximized.

The strength of the cage may be increased using an outer diameter of the cage.

The ball type joint may be installed at an outboard-side end of the shaft, which faces a wheel.

The offset angle is preferably in a range from −45 degrees to +45 degrees.

A ratio (R1/PCD) of a pitch circle diameter (PCD) of the balls positioned symmetrical with each other with respect to the joint rotation center r1 to the offset amount R1 is in a range of 0.040 to 0.130.

As described above, in the angled offset ball type constant velocity joint for a vehicle according to the present invention, the strength of the joint can be enhanced by compensating for a contact surface pressure between an outer race groove and a ball while maintaining an outer diameter of the outer race by making an outer race rotation center and an inner race rotation center positioned to be symmetrical with respect to each other by an offset angle.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF THE INVENTION

Hereinafter, a preferred embodiment of the present invention will be described with reference to the accompanying drawings with several exemplary or preferred embodiments thereof. Other advantages and features of the invention will also become apparent upon reading the following detailed description and upon reference to the accompanying drawings. However, the following descriptions of such embodiments are intended primarily for illustrating the principles and exemplary constructions of the present invention, and the present invention is not specifically limited to these exemplary embodiments. Thus, one skilled in the art can appreciate or recognize that various modifications, substitutions and equivalents thereof can be made thereto without departing from the spirit and scope of the present invention.

Figure 1:
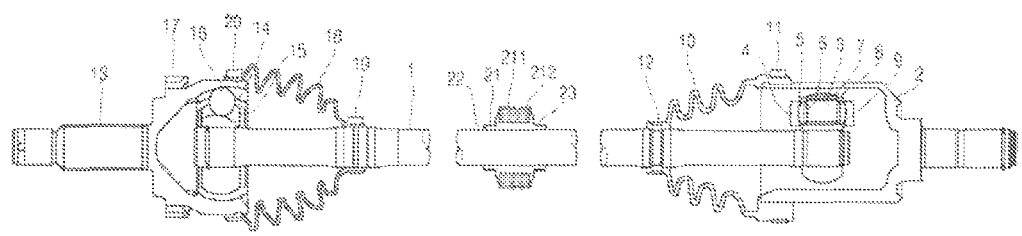
FIG. 1 is a cross-sectional view illustrating a conventional constant velocity joints.
Figure 2:
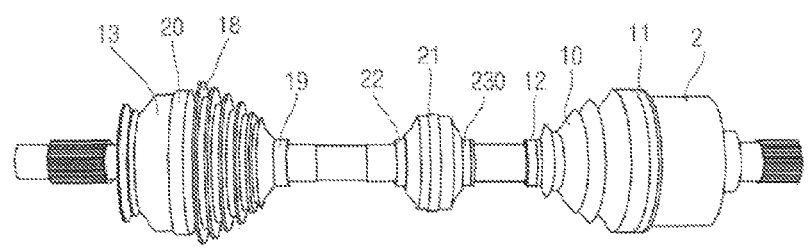
FIG. 2 is a schematic view illustrating an external appearance of the conventional constant velocity joints shown in FIG. 1.
Figure 3:
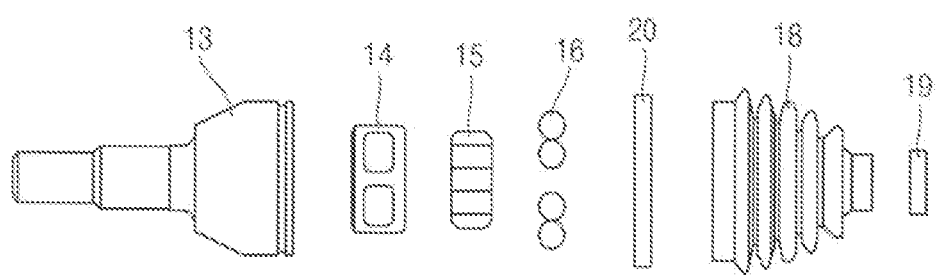
FIG. 3 is an exploded view illustrating a conventional ball type constant velocity joint for a vehicle.
Figure 4:
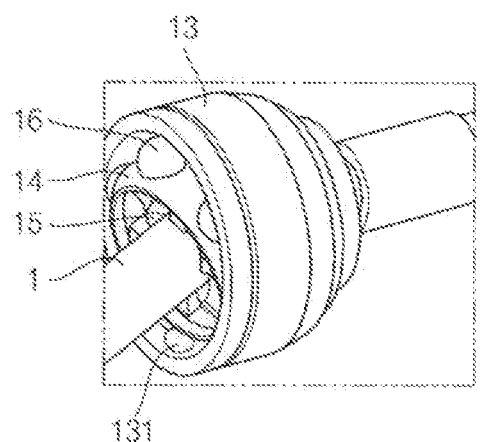
FIG. 4 is a perspective view of the conventional ball type constant velocity joint shown in FIG. 1.
Figure 5:
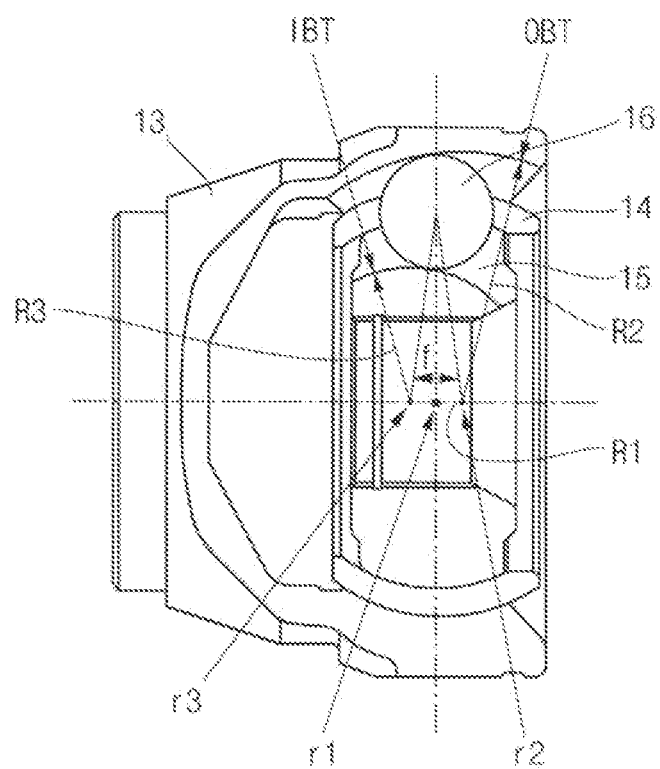
FIG. 5 is a cross-sectional view illustrating the conventional ball type constant velocity joint for a vehicle before a joint angle is created.
Figure 6:
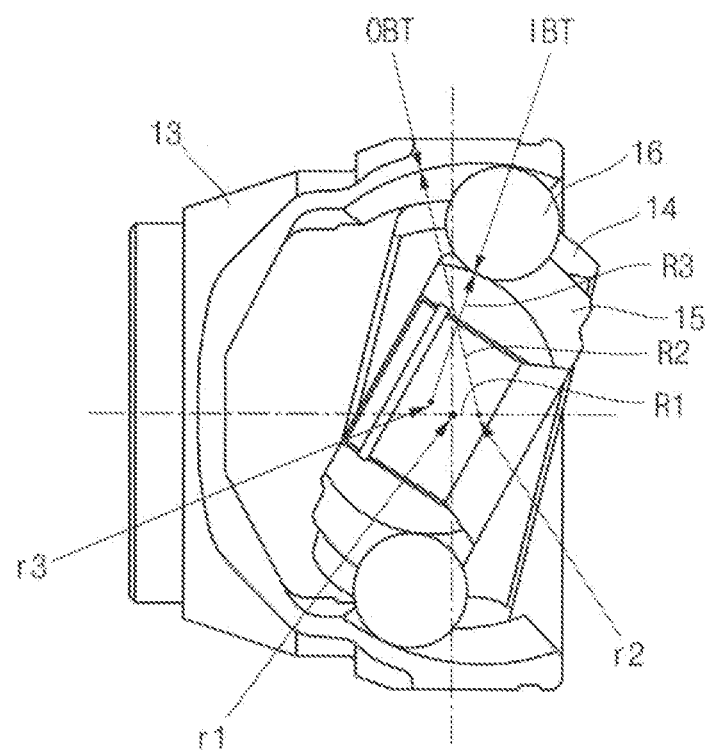
FIG. 6 is a cross-sectional view illustrating the conventional ball type constant velocity joint shown in FIG. 5 after a joint angle is created.
Figure 7:
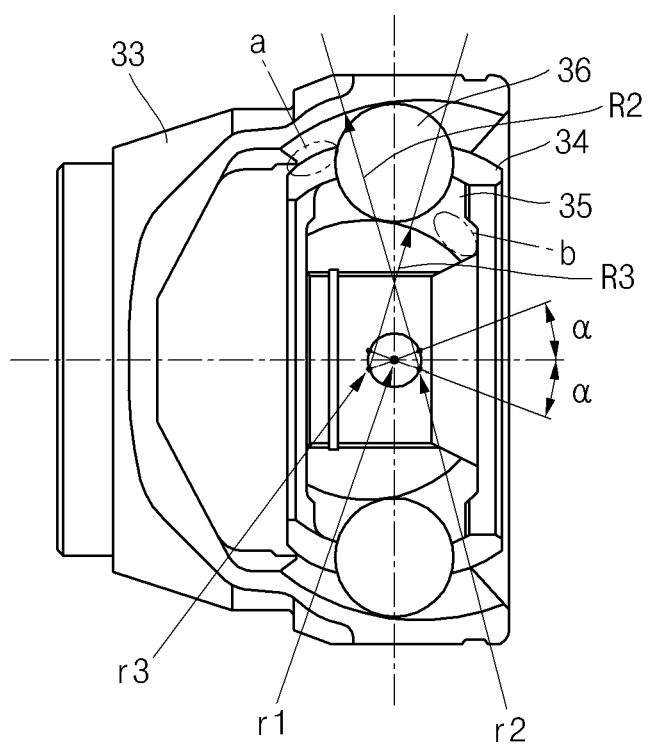
FIG. 7 is a cross-sectional view illustrating an angled ball type constant velocity joint for a vehicle according to an embodiment of the present invention before a joint angle is created.
Figure 8:
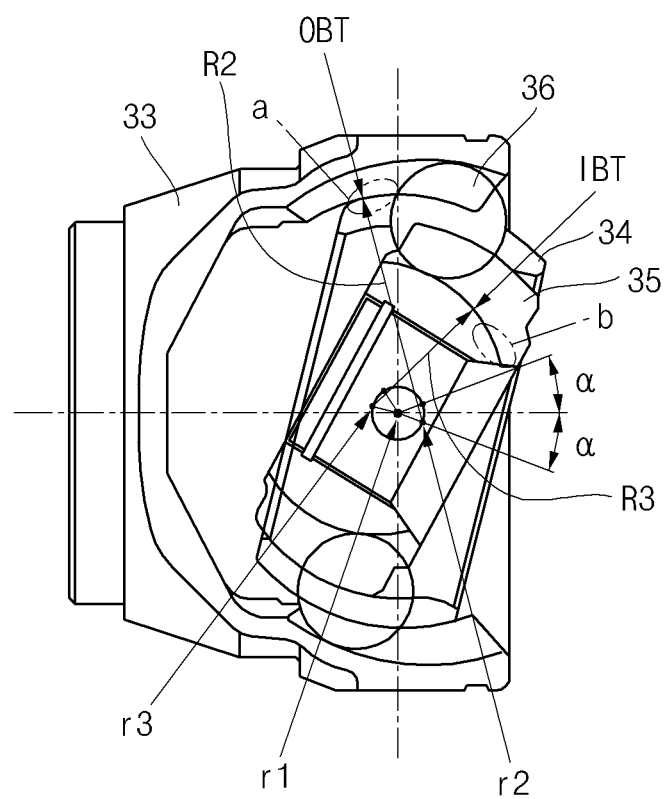
FIG. 8 is a cross-sectional view illustrating the ball type constant velocity joint shown in FIG. 7 after a joint angle is created.
Figure 9:
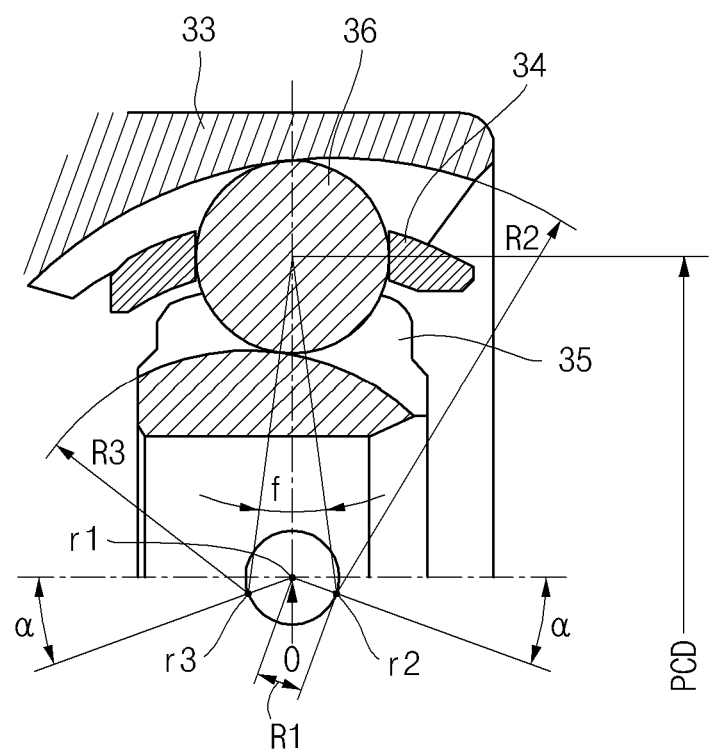
FIG. 9 is an enlarged view illustrating essential parts of the ball type constant velocity joint shown in FIG. 7.

FIG. 7 is a cross-sectional view illustrating an angled ball type constant velocity joint for a vehicle according to an embodiment of the present invention before a joint angle is created, FIG. 8 is a cross-sectional view illustrating the ball type constant velocity joint shown in FIG. 7 after a joint angle is created, and FIG. 9 is an enlarged view illustrating essential parts of the ball type constant velocity joint shown in FIG. 7.

As shown in FIGS. 7 to 9, the angled offset ball type constant velocity joint for a vehicle according to an embodiment of the present invention includes an inner race 35 installed at an end of a shaft, an outer race 33 installed outside the inner race 35, a plurality of balls 36 for transmitting rotational power of the inner race 35 to the outer race 33, and a cage 34 having windows for supporting the balls 36. Here, a rotation center r2 of a ball track (OBT) of the outer race 33 and a rotation center r3 of a ball track (IBT) of the inner race 35 are spaced apart from each other and is symmetrical with each other by an offset angle ($\alpha$).

The offset angle ($\alpha$) is in a range from −45 degrees to +45 degrees.

Since a ratio (R1/PCD) of a pitch circle diameter (PCD) of the balls 36 positioned symmetrical with each other with respect to the joint rotation center r1 to the offset amount R1 is in a range of 0.040 to 0.130, a funnel angle (f) formed between the rotation center r2 of the outer race ball track (OBT) and the rotation center r3 of the inner race ball track (IBT) at the center of the balls 36 is maintained in a range of 12° to 15° for a 6-ball type joint and in a range of 7° to 12° for a 8-ball type joint, thereby facilitating bending and rotating of the joint.

Hereafter, the operation of the angled offset ball type constant velocity joint for a vehicle according to an embodiment of the present invention constructed as mentioned above will be described.

As a shaft is rotated by the rotational power outputted from an engine (not shown), the rotational power of the shaft is transmitted to the outer race 33 through the inner race 35 and the balls 36 and wheels (not shown) to which the outer race 33 is coupled are rotated.

In this case, in the angled offset ball type constant velocity joint for a vehicle according to the embodiment of the present invention, a rotation angle of the outer race 33 is changed by the balls 36, so that a joint angle is created to follow the displacement of the vehicle. The rotation center r2 of the outer race ball track (OBT) and the rotation center r3 of the inner race ball track (IBT) are positioned to be symmetrical with respect to each other by the offset angle ($\alpha$), thereby enhancing the overall strength of the joint by compensating for a groove contact surface pressure of the outer race 33 while maintaining an outer diameter of the outer race 33. In other words, referring to FIGS. 7 and 8, a portion indicated by reference symbol 'a' is a portion in a groove of the outer race 33 is increased by the offset angle ($\alpha$), the portion implementing the smallest contact area with respect to the ball 36 when the joint angle is maximized, and a contact surface pressure may be reduced by increasing the contact area of the portion 'a' by the offset angle ($\alpha$). A portion indicated by reference symbol 'b' is a portion in a groove of the inner race 35 is reduced by the offset angle ($\alpha$), the portion implementing the largest contact area with respect to the ball 36 when the joint angle is maximized. In such a manner, the overall groove contact surface pressure can be compensated for by reducing the contact area by the offset angle ($\alpha$) even if the contact surface pressure is increased. Here, the offset angle ($\alpha$) is in a range from −45 degrees to °45 degrees. In addition, the ratio (R1/PCD) of a pitch circle diameter (PCD) of the balls 36 positioned symmetrical with each other with respect to the joint rotation center r1 to the offset amount R1 is in a range of 0.040 to 0.130.

As described above, if a contact surface pressure between grooves of the outer race 33 and the inner race 35 is compensated for, the strength of the cage 34 can be enhanced by relatively increasing the outer diameter of the cage 34.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. An angled offset ball type constant velocity joint for a vehicle, comprising:
    an inner race connected to an end of a shaft and having an inner race ball track defining a constant radius from an inner race rotation center along the entire length of the inner race ball track;
    an outer race installed outside the inner race and having an outer race ball track defining a constant radius from an outer race rotation center along the entire length of the outer race;
    a plurality of balls for transmitting a torque of the inner race to the outer race, at least one of the plurality of balls engaging with the inner race ball track and the outer race ball track; and
    a cage having windows for supporting the respective balls, wherein a rotation center of the outer race ball track is symmetrical with a rotation center of the inner race ball track by an offset angle including both axial and radial components relative to a longitudinal axis passing through a joint rotation center, the offset angle having a maximum magnitude of approximately 45 degrees; and
    wherein a ratio (R1/PCD) of a pitch circle diameter (PCD) of the balls positioned symmetrical with each other with respect to the joint rotation center r1 to an offset amount R1 collectively defined by the axial and radial components of the offset angle is in a range of 0.040 to 0.130.

2. The angled offset ball type constant velocity joint of claim 1, wherein a contact surface pressure between the outer race and the plurality of balls is reduced by increasing the joint angle.

3. The angled offset ball type constant velocity joint of claim 1, wherein the strength of the cage is increased by increasing an outer diameter of the cage.

4. The angled offset ball type constant velocity joint of claim 1, wherein the ball type joint is installed at an outboard-side end of the shaft, which faces a wheel.

5. The angled offset ball type constant velocity joint of claim 1, wherein the offset angle is in a range from −45 degrees to +45 degrees.

6. The angled offset ball type constant velocity joint of claim 1, wherein the outer race is disposed about an outer race axis which passes through the joint rotation center, the offset angle including both axial and radial components relative to the outer race axis.

7. The angled offset ball type constant velocity joint of claim 1, wherein the inner race defines a convex configuration along the entire length thereof.

8. The angled offset ball type constant velocity joint of claim 1, wherein inner race defines a constant radius in two directions from the inner race rotation center.

9. An angled offset ball type constant velocity joint for a vehicle, comprising:

an inner race connected to an end of a shaft and having an inner race ball track that is of a convex configuration along the entire length thereof;

an outer race installed outside the inner race;

a plurality of balls for transmitting a torque of the inner race to the outer race;

a cage having windows for supporting the respective balls, wherein a rotation center of an outer race ball track, and a rotation center of the inner race ball track are spaced from a longitudinal joint axis defined by the constant velocity joint and extending through a joint rotation center by an offset angle including both axial and radial components relative to the longitudinal joint axis, the offset angle having a maximum magnitude of approximately 45 degrees;

wherein a ratio (R1/PCD) of a pitch circle diameter (PCD) of the balls positioned symmetrical with each other with respect to the joint rotation center r1 to an offset amount R1 collectively defined by the axial and radial components of the offset angle is in a range of 0.040 to 0.130.

10. The angled offset ball type constant velocity joint of claim 9, wherein the rotation center of the outer race ball track is symmetrical with the rotation center of the inner race ball track by the offset angle.

11. The angled offset ball type constant velocity joint of claim 10, wherein a contact surface pressure between the outer race and the plurality of balls is reduced by increasing the joint angle.

12. The angled offset ball type constant velocity joint of claim 10, wherein the offset angle is in a range from −45 degrees to +45 degrees.

13. The angled offset ball type constant velocity joint of claim 9, wherein the strength of the cage is increased by increasing an outer diameter of the cage.

14. The angled offset ball type constant velocity joint of claim 9, wherein the ball type joint is installed at an outboard-side end of the shaft, which faces a wheel.

15. The angled offset ball type constant velocity joint of claim 9, wherein the inner race defines a constant radius from an inner race rotation center in two directions.

16. The angled offset ball type constant velocity joint of claim 9, wherein the outer race defines a constant radius from an outer race rotation center.

\* \* \* \* \*